United States Patent
Varagniat

(10) Patent No.: US 10,781,299 B2
(45) Date of Patent: Sep. 22, 2020

(54) RUBBER COMPOSITION INCLUDING A HYDROCARBON RESIN HAVING A LOW GLASS TRANSITION TEMPERATURE, A SPECIFIC COUPLING AGENT AND A PRIMARY AMINE

(71) Applicant: COMPAGNIE GENERALE DES ETABLISSEMENTS MICHELIN, Clermont-Ferrand (FR)

(72) Inventor: Franck Varagniat, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 256 days.

(21) Appl. No.: 15/740,384

(22) PCT Filed: Jun. 30, 2016

(86) PCT No.: PCT/EP2016/065404
§ 371 (c)(1),
(2) Date: Dec. 28, 2017

(87) PCT Pub. No.: WO2017/001614
PCT Pub. Date: Jan. 5, 2017

(65) Prior Publication Data
US 2018/0194934 A1 Jul. 12, 2018

(30) Foreign Application Priority Data
Jul. 2, 2015 (FR) ...................................... 15 56232

(51) Int. Cl.
*C08K 5/548* (2006.01)
*C08K 5/17* (2006.01)
*B60C 1/00* (2006.01)
*C08L 9/06* (2006.01)

(52) U.S. Cl.
CPC .......... *C08L 9/06* (2013.01); *B60C 1/00* (2013.01); *B60C 1/0016* (2013.01); *C08K 5/17* (2013.01); *C08K 5/548* (2013.01)

(58) Field of Classification Search
CPC .......... C08K 5/17; C08K 5/548; B60C 1/0016
See application file for complete search history.

(56) References Cited

U.S. PATENT DOCUMENTS

| | | |
|---|---|---|
| 5,227,425 A | 7/1993 | Rauline |
| 5,852,099 A | 12/1998 | Vanel |
| 5,900,449 A | 5/1999 | Custodero et al. |
| 5,977,238 A | 11/1999 | Labauze |
| 6,013,718 A | 1/2000 | Cabioch et al. |
| 6,420,488 B1 | 7/2002 | Penot |
| 6,503,973 B2 | 1/2003 | Robert et al. |
| 6,536,492 B2 | 3/2003 | Vasseur |
| 6,774,255 B1 | 8/2004 | Tardivat et al. |
| 6,815,473 B2 | 11/2004 | Robert et al. |
| 7,250,463 B2 | 7/2007 | Durel et al. |
| 7,312,264 B2 | 12/2007 | Gandon-Pain |
| 7,335,692 B2 | 2/2008 | Vasseur et al. |
| 7,488,768 B2 | 2/2009 | Tardivat et al. |
| 7,820,771 B2 | 10/2010 | Lapra et al. |
| 7,825,183 B2 | 11/2010 | Robert et al. |
| 7,834,074 B2 | 11/2010 | Brunelet et al. |
| 7,882,874 B2 | 2/2011 | Robert et al. |
| 8,344,063 B2 | 1/2013 | Marechal et al. |
| 8,455,584 B2 | 6/2013 | Robert et al. |
| 8,461,269 B2 | 6/2013 | Gandon-Pain et al. |
| 8,492,479 B2 | 7/2013 | Robert et al. |
| 8,883,929 B2 | 11/2014 | Gandon-Pain et al. |

(Continued)

FOREIGN PATENT DOCUMENTS

| | | |
|---|---|---|
| EP | 0 501 227 A1 | 9/1992 |
| EP | 0 735 088 A1 | 10/1996 |
| EP | 0 810 258 A1 | 12/1997 |
| EP | 1127909 A1 | 8/2001 |
| EP | 2 740 757 A1 | 6/2014 |
| EP | 2 743 301 A1 | 6/2014 |
| FR | 2740778 A1 | 5/1997 |
| FR | 2765882 A1 | 1/1999 |
| FR | 2 974 808 A1 | 11/2012 |
| JP | 2001144262 A | 5/2001 |
| JP | 2005213486 A | 8/2005 |
| JP | 2012-121966 A | 6/2012 |
| JP | 2012-136581 | 7/2012 |

(Continued)

OTHER PUBLICATIONS

International Search Report dated Aug. 16, 2016, issued by EPO in connection with International Application No. PCT/EP2016/065404.

*Primary Examiner* — Vickey Nerangis
(74) *Attorney, Agent, or Firm* — Venable LLP

(57) ABSTRACT

A rubber composition is based on at least a diene elastomer; 50 to 160 phr (parts by weight per hundred parts by weight of elastomer) of inorganic reinforcing filler; a vulcanization system; a plasticizing system comprising at least one hydrocarbon resin with a glass transition temperature (Tg) of between −40° C. and 20° C.; as coupling agent, a hydroxysilane polysulfide corresponding to the general formula (I): $(HO)_a R_{(3-a)}Si—R'—S_x—R'—SiR_{(3-b)}(OH)_b$ (I), in which the R radicals, which are identical or different, are hydrocarbon groups preferably comprising from 1 to 15 carbon atoms, the R' radicals, which are identical or different, are divalent connecting groups preferably comprising from 1 to 18 carbon atoms, a and b, which are identical or different, are equal to 1 or 2, x is a number greater than or equal to 2; and a primary amine of formula (IV): $R—NH_2$(IV), in which R represents a linear or branched hydrocarbon group comprising from 8 to 24 carbon atoms. The composition is devoid of or comprises less than 0.5 phr of guanidine derivative.

66 Claims, No Drawings

(56) References Cited

U.S. PATENT DOCUMENTS

| | | |
|---|---|---|
| 8,993,664 B2 | 3/2015 | Miyazaki ............ 524/274 |
| 9,080,041 B2 | 7/2015 | Lopitaux et al. |
| 9,670,291 B2 | 6/2017 | Marechal et al. |
| 10,227,475 B2 * | 3/2019 | Darnaud ............ C08L 9/06 |
| 2001/0036991 A1 | 11/2001 | Robert et al. |
| 2002/0183436 A1 | 12/2002 | Robert et al. |
| 2004/0051210 A1 | 3/2004 | Tardivat et al. |
| 2004/0127617 A1 | 7/2004 | Vasseur et al. |
| 2006/0089445 A1 | 4/2006 | Gandon-Pain |
| 2008/0132644 A1 | 6/2008 | Lapra et al. |
| 2009/0270558 A1 | 10/2009 | Gandon-pain et al. |
| 2010/0022714 A1 | 1/2010 | Varagniat et al. |
| 2010/0184912 A1 | 7/2010 | Marechal et al. |
| 2010/0249270 A1 | 9/2010 | Robert et al. |
| 2010/0252156 A1 | 10/2010 | Robert et al. |
| 2011/0021702 A1 | 1/2011 | Gandon-Pain et al. |
| 2012/0208948 A1 | 8/2012 | Gandon-Pain et al. |
| 2012/0252928 A1 | 10/2012 | Marechal et al. |
| 2014/0024745 A1 | 1/2014 | Vasseur et al. ............ 523/511 |
| 2014/0155521 A1 | 6/2014 | Miyazaki ............ 523/156 |
| 2014/0171557 A1 | 6/2014 | Ringot ............ 524/83 |
| 2015/0322241 A1 | 11/2015 | Darnaud et al. ......... C08K 5/47 |
| 2017/0218187 A1 | 8/2017 | Ringot ............ C08L 9/06 |
| 2018/0186979 A1 | 7/2018 | Labrunie |

FOREIGN PATENT DOCUMENTS

| | | |
|---|---|---|
| WO | 97/36724 A2 | 10/1997 |
| WO | 99/16600 A1 | 4/1999 |
| WO | 00/05300 | 2/2000 |
| WO | 00/05301 | 2/2000 |
| WO | 01/92402 A1 | 12/2001 |
| WO | 02/30939 A1 | 4/2002 |
| WO | 02/31041 A1 | 4/2002 |
| WO | 02/088238 A1 | 11/2002 |
| WO | 03/016387 A1 | 2/2003 |
| WO | 2004/096865 A2 | 11/2004 |
| WO | 2005/087859 A1 | 9/2005 |
| WO | 2006/061064 A1 | 6/2006 |
| WO | 2006/069792 A1 | 7/2006 |
| WO | 2006/069793 A1 | 7/2006 |
| WO | 2008/003434 A1 | 1/2008 |
| WO | 2008/003435 A1 | 1/2008 |
| WO | 2008/141702 A1 | 11/2008 |
| WO | 2009/000750 A1 | 12/2008 |
| WO | 2009/000752 A1 | 12/2008 |
| WO | 2011/042507 A1 | 4/2011 |
| WO | 2012/084847 A1 | 6/2012 |
| WO | 2013/092523 A1 | 6/2013 |
| WO | 2014180673 A1 | 11/2014 |

* cited by examiner

RUBBER COMPOSITION INCLUDING A HYDROCARBON RESIN HAVING A LOW GLASS TRANSITION TEMPERATURE, A SPECIFIC COUPLING AGENT AND A PRIMARY AMINE

FIELD OF THE INVENTION

The invention relates to compositions, especially for tyres, and more particularly to compositions for a tread.

RELATED ART

Since fuel savings and the need to protect the environment have become a priority, it has proved necessary to produce tyres having a reduced rolling resistance, without adversely affecting other properties of the tyre. Manufacturers have developed tyre compositions which make it possible to reduce this rolling resistance, especially by the introduction of silica as reinforcing filler, or of resin with a high glass transition temperature as plasticizer.

For example, the Applicant Companies have already described the use of high-Tg resins, as described in documents WO-2005/087859 and WO-2006/061064.

Some documents describe the use of low-Tg resins, such as for example in document JP-2005213486, which proposes the use of low-Tg resin at a content of between 0.5 and 5 phr for improving the green tack and the industrial feasibility of the compositions. Document US-2007/0167557 proposes the use of low-Tg resin at a content of 10 phr for improving the chipping resistance. With regard to document JP-2001144262, it describes compositions, the abrasion resistance and the grip of which are improved and which comprise low-Tg resins.

Furthermore, document WO-2014/180673 describes the use of a primary amine for reducing the hysteresis of diene rubber compositions comprising silica as predominant reinforcing filler.

Nonetheless, manufacturers are always seeking solutions for improving, at the same time, all the performance properties of the compositions for tyres and in particular the rolling resistance, at the same time as the viscosity of the uncured compositions, associated with the ease of industrial processing of the compositions (processability).

The Applicant Companies have now shown that particular compositions comprising silica as predominant filler, a specific coupling agent, a low-Tg plasticizing resin and a primary amine made it possible to have an improved compromise between numerous desired performance properties for tyre compositions, especially the rolling resistance, at the same time as the viscosity of the uncured compositions.

BRIEF DESCRIPTION OF EMBODIMENTS OF THE INVENTION

The invention therefore relates to a rubber composition based on at least a diene elastomer, 50 to 160 phr (parts by weight per hundred parts by weight of elastomer) of inorganic reinforcing filler, a vulcanization system, a plasticizing system comprising at least one hydrocarbon resin with a glass transition temperature (Tg) of between −40° C. and 20° C., as coupling agent, a hydroxysilane polysulfide corresponding to the general formula (I):

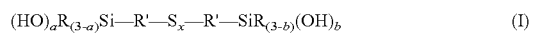

in which the R radicals, which are identical or different, are hydrocarbon groups preferably comprising from 1 to 15 carbon atoms; the R' radicals, which are identical or different, are divalent connecting groups preferably comprising from 1 to 18 carbon atoms; a and b, which are identical or different, are equal to 1 or 2; x is a number greater than or equal to 2, and a primary amine of formula (IV):

in which R represents a linear or branched hydrocarbon group comprising from 8 to 24 carbon atoms, said composition being devoid of or comprising less than 0.5 phr of guanidine derivative.

Preferentially, the invention relates to a composition as defined above in which said diene elastomer is selected from the group consisting of polybutadienes, synthetic polyisoprenes, natural rubber, butadiene copolymers, isoprene copolymers and the mixtures of these elastomers. Preferably, said diene elastomer is selected from the group consisting of polybutadienes, copolymers of butadiene and styrene, and the mixtures of these elastomers.

Also preferentially, the invention relates to a composition as defined above in which the reinforcing filler is selected from the group consisting of silicas, carbon blacks and the mixtures thereof. Preferentially, the content of inorganic reinforcing filler is within a range extending from 50 to 160 phr. Preferably, the inorganic reinforcing filler is silica. Also preferably, the content of silica is within a range extending from 50 to 150 phr, preferably from 60 to 150 phr. Preferentially, the predominant reinforcing filler is silica, preferably at a content within a range extending from 120 to 150 phr, preferably from 130 to 150 phr.

Also preferentially, the invention relates to a composition as defined above which comprises, in a minority amount, carbon black, preferentially at a content within a range of between 0 and 50 phr.

Preferably, the invention relates to a composition as defined above in which the content of coupling agent is between 2 and 15 phr, more preferentially between 3 and 13 phr, better still between 5 and 10 phr.

Preferentially, the invention relates to a composition as defined above in which the coupling agent of formula (I) is a monohydroxysilane in which a and b are equal to 1. Preferably, the coupling agent of formula (I) is such that the R radicals are chosen from C1-C6 alkyls, C5-C8 cycloalkyls or a phenyl radical; the R' radicals are chosen from C1-C18 alkylenes or C6-C12 arylenes. Also preferably, the coupling agent of formula (I) is such that the R radicals are chosen from C1-C6 alkyls and the R' radicals from C1-C10 alkylenes. Preferentially, the coupling agent of formula (I) is a monohydroxysilane polysulfide of formula (II):

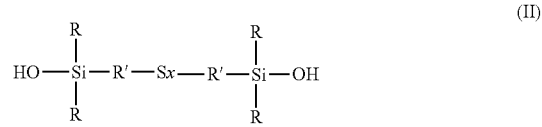

in which the R radicals are $C_1$-$C_3$ alkyls, preferably methyl; the R' radicals are $C_1$-$C_4$ alkylenes, preferably methylene, ethylene or propylene; x is greater than or equal to 2. More preferentially, the coupling agent of formula (I) a bis(propyldimethylsilanol) polysulfide of specific formula (III):

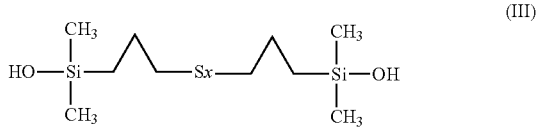

(III)

Preferentially, the invention relates to a composition as defined above, said composition containing less than 0.45 phr of guanidine derivative and preferably less than 0.4 phr.

Also preferentially, the invention relates to a composition as defined above in which the content of primary amine is from 0.2 to 8 phr, preferably from more than 0.3 phr to 7 phr. Preferentially, the content of primary amine is from 0.5 to 5 phr, preferably from more than 0.6 phr to 4 phr. Preferably, the primary amine of formula (IV) bears an R radical which represents a hydrocarbon group comprising from 10 to 22 carbon atoms. More preferentially, R represents a hydrocarbon group comprising from 12 to 20 carbon atoms and preferably from 14 to 20 carbon atoms. Preferably, R represents a linear hydrocarbon group, preferably an alkyl group or an alkenyl group.

Preferentially, the invention relates to a composition as defined above, said composition being devoid of zinc or contains less than 0.5 phr, preferentially less than 0.3 phr, more preferentially less than 0.2 phr and very preferentially less than 0.1 phr thereof.

Preferably, the invention relates to a composition as defined above in which the total content of plasticizers is greater than or equal to 5 phr, preferably within a range extending from 10 to 120 phr, more preferentially from 10 to 100 phr, better still from 15 to 90 phr.

Also preferentially, the invention relates to a composition as defined above in which the content of hydrocarbon resin with a Tg of between −40° C. and 20° C. is within a range extending from 5 to 80 phr, preferably from 7 to 75 phr, better still from 10 to 50 phr. Preferably, the hydrocarbon resin mentioned above as hydrocarbon resin with a Tg of between −40° C. and 20° C. has a Tg of between −40° C. and 0° C., more preferentially between −30° C. and 0° C. and more preferentially still between −20° C. and 0° C. Also preferably, the hydrocarbon resin mentioned above as hydrocarbon resin with a Tg of between −40° C. and 20° C. has a number-average molecular weight of less than 800 g/mol, preferably less than 600 g/mol, better still less than 400 g/mol. Preferentially, the hydrocarbon resin mentioned above as hydrocarbon resin with a Tg of between −40° C. and 20° C. has a softening point within a range extending from 0 to 50° C., preferentially from 0 to 40° C., more preferentially from 10 to 40° C., preferably from 10 to 30° C. Also preferentially, the hydrocarbon resin mentioned above as hydrocarbon resin with a Tg of between −40° C. and 20° C. has a polydispersity index (PDI) of less than 3, preferably less than 2.

Preferably, the invention relates to a composition as defined above which additionally comprises, in the plasticizing system, a hydrocarbon resin with a Tg of greater than 20° C. Preferably, the content of hydrocarbon resin with a Tg of greater than 20° C. is within a range extending from 5 to 50 phr, preferably from 5 to 40 phr, better still from 10 to 40 phr. Preferentially, the hydrocarbon resin mentioned above as hydrocarbon resin with a Tg of greater than 20° C. has a Tg of greater than 30° C. Also preferably, the hydrocarbon resin mentioned above as hydrocarbon resin with a Tg of greater than 20° C. has a number-average molecular weight of between 400 and 2000 g/mol, preferably between 500 and 1500 g/mol. Preferentially again, the hydrocarbon resin mentioned above as hydrocarbon resin with a Tg of greater than 20° C. has a polydispersity index (PDI) of less than 3, preferably of less than 2.

Also preferably, the invention relates to a composition as defined above which additionally comprises, in the plasticizing system, a plasticizing oil. Preferentially, the plasticizing oil is selected from the group consisting of naphthenic oils, paraffinic oils, MES (Medium Extracted Solvates) oils, TDAE (Treated Distillate Aromatic Extracts) oils, mineral oils, vegetable oils, ether plasticizers, ester plasticizers, phosphate plasticizers, sulfonate plasticizers and the mixtures of these compounds. Preferably, the content of plasticizing oil is within a range extending from 2 to 80 phr, preferably from 5 to 60 phr.

Also preferably, the invention relates to a composition as defined above in which the ratio of the total content of filler to the total content of plasticizer is within a range extending from 1.5 to 5, preferably from 1.6 to 4.5.

Also, the invention relates to a tyre comprising a composition as defined above, preferably in all or part of the tread thereof.

Preferentially, the tyre according to the invention will be chosen from the tyres intended to equip a two-wheeled vehicle, a passenger vehicle, or else a "heavy-duty" vehicle (that is to say, underground train, bus, off-road vehicles, heavy road transport vehicles, such as lorries, tractors or trailers), or else aircraft, construction equipment, heavy agricultural vehicles or handling vehicles.

DETAILED DESCRIPTION OF THE INVENTION

I—Constituents of the Composition

The rubber compositions according to the invention are based on at least a diene elastomer, 50 to 160 phr (parts by weight per hundred parts by weight of elastomer) of inorganic reinforcing filler, a vulcanization system, a plasticizing system comprising at least one hydrocarbon resin with a glass transition temperature (Tg) of between −40° C. and 20° C., as coupling agent, a hydroxysilane polysulfide corresponding to the general formula (I):

$$(HO)_a R_{(3-a)} Si-R'-S_x-R'-SiR_{(3-b)}(OH)_b \qquad (I)$$

in which the R radicals, which are identical or different, are hydrocarbon groups preferably comprising from 1 to 15 carbon atoms; the R' radicals, which are identical or different, are divalent connecting groups preferably comprising from 1 to 18 carbon atoms; a and b, which are identical or different, are equal to 1 or 2; x is a number greater than or equal to 2, and a primary amine of formula (IV):

$$R-NH_2 \qquad (IV)$$

in which R represents a linear or branched hydrocarbon group comprising from 8 to 24 carbon atoms, said composition being devoid of or comprising less than 0.5 phr of guanidine derivative.

The expression "composition based on" should be understood as meaning a composition comprising the mixture and/or the product of the in situ reaction of the various base constituents used, some of these constituents being able to react and/or being intended to react with one another, at least partially, during the various phases of manufacture of the composition or during the subsequent curing, modifying the composition as it is prepared at the start. Thus, the compositions as employed for the invention can be different in the non-crosslinked state and in the crosslinked state.

In the present description, unless expressly indicated otherwise, all the percentages (%) shown are percentages by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

I-Diene Elastomer

The compositions can comprise just one diene elastomer or a mixture of several diene elastomers.

It is recalled here that elastomer (or "rubber", the two terms being regarded as synonymous) of the "diene" type should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

Diene elastomers can be classified into two categories: "essentially unsaturated" or "essentially saturated". "Essentially unsaturated" is generally understood to mean a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15%, of units of diene origin). In the category of "essentially unsaturated" diene elastomers, "highly unsaturated" diene elastomer is understood in particular to mean a diene elastomer having a content of units of diene origin (conjugated dienes) which is greater than 50%.

Given these definitions, diene elastomer capable of being used in the compositions according to the invention is understood more particularly to mean:

(a) any homopolymer obtained by polymerization of a conjugated diene monomer having from 4 to 12 carbon atoms;
(b) any copolymer obtained by copolymerization of one or more conjugated dienes with one another or with one or more vinylaromatic compounds having from 8 to 20 carbon atoms;
(c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidene norbornene or dicyclopentadiene;
(d) a copolymer of isobutene and of isoprene (butyl rubber) and also the halogenated versions, in particular chlorinated or brominated versions, of this type of copolymer.

Although it applies to any type of diene elastomer, a person skilled in the art of tyres will understand that the present invention is preferably employed with essentially unsaturated diene elastomers, in particular of the above type (a) or (b).

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent. For coupling to carbon black, mention may for example be made of functional groups comprising a C—Sn bond or aminated functional groups, such as aminobenzophenone, for example; for coupling to a reinforcing inorganic filler such as silica, mention may for example be made of silanol functional groups or polysiloxane functional groups having a silanol end (such as described, for example, in FR 2 740 778, U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909, U.S. Pat. No. 6,503,973, WO 2009/000750 and WO 2009/000752). Mention may also be made, as other examples of functionalized elastomers, of elastomers (such as SBR, BR, NR or IR) of the epoxidized type.

These functionalized elastomers can be used in a blend with one another or with non-functionalized elastomers. For example, it is possible to use a silanol- or polysiloxane-functionalized elastomer having a silanol end, as a mixture with an elastomer coupled and/or star-branched with tin (described in WO 11/042507), the latter representing a content of 5% to 50%, for example of 25% to 50%.

The following are suitable: polybutadienes and in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and especially those having an isoprene content of between 5% and 90% by weight and a Tg of −40° C. to −80° C., or isoprene/styrene copolymers and especially those having a styrene content of between 5% and 50% by weight and a Tg of between −5° C. and −60° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −20° C. and −70° C., are especially suitable.

To summarize, the diene elastomer of the composition is preferentially selected from the group of highly unsaturated diene elastomers consisting of polybutadienes (abbreviated to "BRs"), synthetic polyisoprenes (IRs), natural rubber (NR), butadiene copolymers, isoprene copolymers and the mixtures of these elastomers. Such copolymers are more preferentially selected from the group consisting of butadiene/styrene copolymers (SBRs), isoprene/butadiene copolymers (BIRs), isoprene/styrene copolymers (SIRs), isoprene/butadiene/styrene copolymers (SBIRs), butadiene/acrylonitrile copolymers (NBRs), butadiene/styrene/acrylonitrile copolymers (NSBRs) or a mixture of two or more of these compounds.

According to a specific embodiment, the composition comprises from 50 to 100 phr of an SBR elastomer, whether an SBR prepared in emulsion ("ESBR") or an SBR prepared in solution ("SSBR").

According to another specific embodiment, the diene elastomer is an SBR/BR blend (mixture).

According to other possible embodiments, the diene elastomer is an SBR/NR (or SBR/IR), BR/NR (or BR/IR) or also SBR/BR/NR (or SBR/BR/IR) blend.

In the case of an SBR (ESBR or SSBR) elastomer, use is especially made of an SBR having a moderate styrene content, for example of between 20% and 35% by weight, or a high styrene content, for example from 35% to 45%, a content of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1,4-bonds.

According to another specific embodiment, the diene elastomer is a predominantly isoprene elastomer (that is to say, the fraction by weight of isoprene elastomer of which is the greatest, compared with the fraction by weight of the other elastomers). "Isoprene elastomer" is understood to mean, in a known way, an isoprene homopolymer or copolymer, in other words a diene elastomer selected from the group consisting of natural rubber (NR), which may be plasticized or peptized, synthetic polyisoprenes (IRs), various isoprene copolymers and the mixtures of these elastomers. Mention will in particular be made, among isoprene copolymers, of isobutene/isoprene (butyl rubber-IIR), isoprene/styrene (SIR), isoprene/butadiene (BIR) or isoprene/butadiene/styrene (SBIR) copolymers. This isoprene elastomer is preferably natural rubber or a synthetic cis-1,4-polyisoprene; use is preferably made, among these synthetic polyisoprenes, of polyisoprenes having a content (mol %) of cis-1,4-bonds of greater than 90%, more preferentially still of greater than 98%.

Preferentially, according to another embodiment, the rubber composition predominantly comprises (that is to say, with the highest content by weight) a non-isoprene diene elastomer. "Non-isoprene diene elastomer" should be understood, within the meaning of the present application, as indicating an elastomer resulting at least in part (i.e., a homopolymer or a copolymer) from diene monomers (monomers bearing two carbon-carbon double bonds) other than isoprene. Thus, non-isoprene diene elastomers within the meaning of the present definition thus also comprise copolymers comprising isoprene as comonomer. Natural rubber and isoprene homopolymers (that is to say, composed of functionalized or non-functionalized isoprene monomers) are excluded from the present definition. According to this preferred embodiment, all the abovementioned elastomers, with the exception of natural rubber and polyisoprenes, are suitable as non-isoprene diene elastomer. In particular, it will be possible to use non-isoprene diene elastomers preferably selected from the group of highly unsaturated diene elastomers consisting of polybutadienes (abbreviated to "BRs"), butadiene copolymers, isoprene copolymers and the mixtures of these elastomers. Such copolymers are more preferentially selected from the group consisting of butadiene/styrene copolymers (SBRs), isoprene/butadiene copolymers (BIRs), isoprene/styrene copolymers (SIRs) and isoprene/butadiene/styrene copolymers (SBIRs). Still according to this preferred embodiment, it will be understood that, in the case of a blend of elastomers, the total content of the "non-isoprene" elastomers must be greater than the total content of the elastomers selected from the group consisting of natural rubber, synthetic polyisoprenes and mixtures thereof. Preferentially, according to this embodiment, the content of non-isoprene diene elastomer is more than 50 phr, more preferentially at least 60 phr, more preferentially at least 70 phr, more preferentially still at least 80 phr and very preferentially at least 90 phr. In particular, according to this embodiment, the content of non-isoprene diene elastomer is very preferentially 100 phr.

According to another preferred embodiment of the invention, the rubber composition comprises a blend of a (one or more) "high-Tg" diene elastomer having a Tg of between −70° C. and 0° C. and of a (one or more) "low-Tg" diene elastomer having a Tg of between −110° C. and −80° C., more preferentially between −105° C. and −90° C. The high-Tg elastomer is preferably selected from the group consisting of S-SBRs, E-SBRs, natural rubber, synthetic polyisoprenes (having a content (mol %) of cis-1,4-linkages preferably of greater than 95%), BIRs, SIRs, SBIRs and the mixtures of these elastomers. The low-Tg elastomer preferably comprises butadiene units in a content (mol %) at least equal to 70%; it preferably consists of a polybutadiene (BR) having a content (mol %) of cis-1,4-linkages of greater than 90%.

According to another specific embodiment of the invention, the rubber composition comprises, for example, between 30 and 90 phr, in particular between 40 and 90 phr, of a high-Tg elastomer as a blend with a low-Tg elastomer.

According to another specific embodiment of the invention, the diene elastomer of the composition according to the invention comprises a blend of a BR (as low-Tg elastomer) having a content (mol %) of cis-1,4-linkages of greater than 90% with one or more S-SBRs or E-SBRs (as high-Tg elastomer(s)).

I-2 Reinforcing Filler

The composition according to the invention comprises at least one reinforcing inorganic filler such as silica, alumina, or else a blend of these two types of filler. In addition, the composition may comprise any type of reinforcing filler known for its abilities to reinforce a rubber composition which can be used in the manufacture of tyres, for example an organic filler, such as carbon black.

All carbon blacks, in particular "tyre-grade" blacks, are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in an isoprene elastomer in the form of a masterbatch (see, for example, applications WO 97/36724 or WO 99/16600).

Mention may be made, as examples of organic fillers other than carbon blacks, of functionalized polyvinyl organic fillers, such as described in applications WO-A-2006/069792, WO-A-2006/069793, WO-A-2008/003434 and WO-A-2008/003435.

The composition can comprise one type of silica or a blend of several silicas. The silica used can be any reinforcing silica known to a person skilled in the art, in particular any precipitated or fumed silica having a BET surface area and a CTAB specific surface area both of less than 450 m²/g, preferably from 30 to 400 m²/g. Mention will be made, as highly dispersible precipitated silicas ("HDSs"), for example, of the Ultrasil 7000 and Ultrasil 7005 silicas from Evonik, the Zeosil 1165MP, 1135MP and 1115MP silicas from Rhodia, the Hi-Sil EZ150G silica from PPG, the Zeopol 8715, 8745 and 8755 silicas from Huber, treated precipitated silicas, such as, for example, the silicas "doped" with aluminium described in application EP-A-0735088, or the silicas with a high specific surface area as described in application WO 03/16837.

The silica preferably has a BET surface area of between 45 and 400 m²/g, more preferentially of between 60 and 300 m²/g.

A person skilled in the art will understand that, as filler equivalent to silica described in the present section, use might be made of a reinforcing filler of another nature, in particular organic nature, provided that this reinforcing filler is covered with a layer of silica or else comprises functional sites, in particular hydroxyl sites, at its surface which require the use of a coupling agent in order to form the bond between the filler and the elastomer.

The physical state in which the reinforcing filler is provided is not important, whether it is in the form of a powder, of micropearls, of granules, of beads or any other appropriate densified form.

For the requirements of the invention, the content of inorganic filler (preferentially silica) is from 50 to 160 phr, more preferentially from 60 to 150 phr and very preferentially from 60 to 140 phr. Below 50 phr of inorganic filler, the composition might have poorer performance with regard to dry and wet grip, whereas, above 160 phr, the composition might have poorer performance with regard to rolling resistance.

Predominant reinforcing filler is understood to mean that which exhibits the greatest content among the reinforcing fillers present in the composition. In particular, predominant reinforcing filler is understood to mean any reinforcing filler which represents at least 50% by weight of the reinforcing fillers present, preferably more than 50% and more preferably more than 60%.

According to one embodiment, the composition comprises silica as predominant filler, as an optional blend with carbon black, as minor filler. In this case, the content of silica is preferentially within a range extending from 50 to 150 phr and preferably from 60 to 150 phr. The content of black is preferentially between 0 and 50 phr, preferably within a range extending from 1 to 30 phr. In this embodiment, the content of black is preferentially within a range extending from 1 to 5 phr and preferentially of less than or equal to 4 phr.

I-3 Coupling Agent

The compositions of the invention comprise an agent for coupling inorganic fillers with the elastomeric matrix that are capable, in a known manner, owing to a connection between the elastomeric matrix and the reinforcing inorganic filler, of enabling an improvement of the dispersion of the filler in the rubber matrix and a lowering of the viscosity of the compositions, and of improving their processability in the uncured state. For the purposes of the invention, the coupling agent comprises a hydroxysilane polysulfide, optionally to which other coupling agents known to a person skilled in the art are added. Hydroxysilane polysulfides are described in patent applications WO 02/30939 (or U.S. Pat. No. 6,774,255) and WO 02/31041 (or US 2004/051210).

In particular and preferentially, the coupling agent may be a hydroxysilane polysulfide (as described in the abovementioned documents) corresponding to the general formula (I):

$$(HO)_a R_{(3-a)}Si-R'-S_x-R'-SiR_{(3-b)}(OH)_b \qquad (I)$$

in which:

the R radicals, which are identical or different, are hydrocarbon groups preferably comprising from 1 to 15 carbon atoms;

the R' radicals, which are identical or different, are divalent connecting groups preferably comprising from 1 to 18 carbon atoms;

a and b, which are identical or different, are equal to 1 or 2;

x is a number greater than or equal to 2.

The R radicals, which are identical or different, linear or branched and preferably comprise from 1 to 15 carbon atoms, are more preferentially selected from alkyls, cycloalkyls or aryls, in particular from C1-C6 alkyls, C5-C8 cycloalkyls and the phenyl radical. Mention will in particular be made, among these radicals, by way of examples, of those selected from the group consisting of methyl, ethyl, n-propyl, isopropyl, n-butyl, sec-butyl, tert-butyl, n-pentyl, neopentyl, n-hexyl, 2-ethylhexyl, n-octyl, isooctyl, cyclopentyl, cyclohexyl, 2-methylcyclohexyl, phenyl, toluyl and benzyl.

More preferably still, the R radicals, which are identical or different, are C1-C3 alkyls (namely methyl, ethyl, n-propyl or isopropyl), very particularly chosen from methyl and ethyl.

The R' radicals, which are identical or different and substituted or unsubstituted, are preferably saturated or unsaturated hydrocarbon radicals comprising from 1 to 18 carbon atoms, it being possible for these R' radicals to be interrupted within the hydrocarbon chain by at least one heteroatom, such as O, S or N. Suitable in particular are C1-C18 alkylene groups or C6-C12 arylene groups, more particularly C1-C10, especially C1-C4, alkylenes, in particular those chosen from methylene, ethylene and propylene.

Preferably, in the hydroxysilane polysulfides corresponding to the general formula (I), the hydroxysilane is a monohydroxysilane, that is to say that a and b are equal to 1. Also preferably, the R radicals are chosen from linear or branched C1-C6 alkyls, C5-C8 cycloalkyls or a phenyl radical; the R' radicals are chosen from C1-C18 alkylenes or C6-C12 arylenes, and more particularly the R radicals are chosen from C1-C6 alkyls and the R' radicals from C1-C10 alkylenes.

Thus, very preferentially, the hydroxysilane is a monohydroxysilane polysulfide of formula (II):

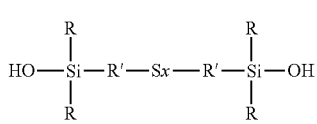

in which the R radicals are C1-C3 alkyls, preferably methyl; the R' radicals are C1-C4 alkylenes, preferably methylene, ethylene or propylene; x is greater than or equal to 2. More particularly, the hydroxysilane may be a bis(propyldimethylsilanol) polysulfide of specific formula (III):

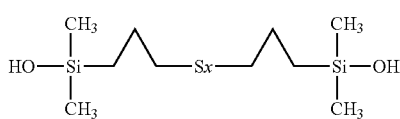

This product of formula (III) corresponds to the product D in the abovementioned document WO 02/31041 (or US 2004/051210).

In the rubber compositions in accordance with the invention, the content of coupling agent is preferentially between 2 and 15 phr, more preferably between 3 and 13 phr and more preferably still between 5 and 10 phr.

I-4 Vulcanization System

The vulcanization system itself is based on sulfur (or on a sulfur donor) and on a vulcanization accelerator. Various known vulcanization activators or secondary accelerators may be added to this base vulcanization system, being incorporated during the first non-productive phase and/or during the productive phase, as described subsequently.

The sulfur is used at a preferred content of between 0.5 and 10 phr, more preferably of between 0.5 and 5 phr, in particular between 0.5 and 3 phr, when the composition of the invention is intended, according to a preferred form of the invention, to constitute a tyre tread.

The vulcanization system of the composition according to the invention comprises an accelerator one or more vulcanization accelerators, for example compounds of the family of the thiurams, zinc dithiocarbamate derivatives, sulfenamides, guanidines or thiophosphates. Use may especially be made of any compound capable of acting as accelerator of the vulcanization of diene elastomers in the presence of sulfur, in particular accelerators of the type of thiazoles and also their derivatives, accelerators of the type of thiurams and zinc dithiocarbamates. These accelerators are more preferably selected from the group consisting of 2-mercaptobenzothiazole disulfide (abbreviated to "MBTS"), N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazolesulfenamide (abbreviated to "TBBS"), N-(tert-butyl)-2-benzothiazolesulfenimide (abbreviated to "TBSI"), zinc dibenzyldithiocarbamate (abbreviated to "ZBEC") and the mixtures of these compounds. Use is preferably made of a primary accelerator of the sulfenamide type.

The vulcanization system of the composition according to the invention may also comprise one or more additional accelerators or activators, for example compounds of the family of thiurams, zinc dithiocarbamate derivatives, sulfenamides, guanidines (provided that they contain less than 0.5 phr thereof) or thiophosphates.

On the other hand, in the tyres according to the invention, the composition necessary for the requirements of the invention is devoid of guanidine derivative or contains less than 0.5 phr thereof. Preferably, the composition is either completely devoid of such compounds or it contains less than 0.45 phr, preferably less than 0.4 phr, more preferentially less than 0.3 phr, preferentially less than 0.2 phr and very preferentially less than 0.1 phr thereof. The term "guanidine derivative" is understood to mean the organic compounds bearing a guanidine functional group as main functional group, such as those known in tyre compositions, in particular as vulcanization accelerators, for example diphenylguanidine (DPG) or di(ortho-tolyl)guanidine (DOTG).

According to a preferred form, in the tyre according to the invention, the composition necessary for the requirements of the invention is also devoid of zinc or contains less than 0.5 phr, preferentially less than 0.3 phr, more preferentially less than 0.2 phr and very preferentially less than 0.1 phr thereof.

I-5 Primary Amine

In order to advantageously replace the guanidine derivatives mentioned above, the tyre according to the invention comprises a primary amine of formula (IV):

$$R-NH2 \quad \quad (IV)$$

in which R represents a linear or branched hydrocarbon group comprising from 8 to 24 carbon atoms.

Preferentially, R represents a linear or branched hydrocarbon group comprising from 10 to 22 carbon atoms, more preferentially from 12 to 20 carbon atoms and very preferentially from 14 to 20 carbon atoms. Preferentially, R represents a linear hydrocarbon group.

A hydrocarbon group is understood within the meaning of the present invention to be a saturated or unsaturated group comprising carbon and hydrogen atoms, such as an alkyl or alkenyl group. Preferentially, the hydrocarbon group comprises from 0 to 3 unsaturations, preferentially 0, 1 or 2.

Preferentially, the hydrocarbon group is saturated, it is therefore an alkyl group.

Alternatively, and also preferentially, this hydrocarbon group is unsaturated, it is therefore an alkenyl group.

Preferentially, the primary amine as defined above may be selected from linear alkylamines. Very preferentially, it is hexadecylamine or octadecylamine, and in particular octadecylamine.

Octadecylamine (or stearylamine) is commercially available, for example in powder form from a supplier such as Aldrich.

Preferentially, the content of primary amine in the composition is within a range varying from 0.2 to 8 phr, more preferentially from 0.3 to 7 phr, preferably from more than 0.5 phr to 5 phr and more preferentially from 0.6 to 4 phr.

It may be noted that the primary amine as defined below is preferentially introduced in the free base form, that is to say not forming a salt with an inorganic or organic acid.

I-6 Plasticizing System

The composition according to the invention comprises a plasticizing system. This plasticizing system is composed of at least one low-Tg hydrocarbon resin. In addition to this low-Tg resin, the plasticizing system of the composition may optionally comprise a high-Tg hydrocarbon resin and/or a plasticizing oil.

The total content of plasticizer in the composition is greater than or equal to 5 phr, more preferentially greater than or equal to 10 phr, preferably from 10 to 120 phr, in particular from 10 to 100 phr, for example from 15 to 90 phr.

Below 5 phr and especially below 10 phr of plasticizer, the composition might be less effective with regard to industrial processability.

I-6-1 Low-Tg Resin

The plasticizing system of the composition of the invention comprises a hydrocarbon resin which is viscous at 20° C., referred to as "low-Tg" resin, that is to say which, by definition, has a Tg within a range extending from −40° C. to 20° C.

Preferably, the low-Tg plasticizing hydrocarbon resin has at least any one of the following characteristics:
- a Tg of between −40° C. and 0° C., more preferentially between −30° C. and 0° C. and more preferentially still between −20° C. and 0° C.;
- a number-average molecular weight (Mn) of less than 800 g/mol, preferably of less than 600 g/mol and more preferentially of less than 400 g/mol;
- a softening point within a range extending from 0° C. to 50° C., preferentially from 0° C. to 40° C., more preferentially from 10° C. to 40° C., preferably from 10° C. to 30° C.;
- a polydispersity index (PDI) of less than 3, more preferentially of less than 2 (as a reminder: PDI=Mw/Mn, with Mw the weight-average molecular weight).

More preferentially, this low-Tg plasticizing hydrocarbon resin has all of the preferred characteristics above.

The softening point is measured according to the standard ISO 4625 ("Ring and Ball" method). The Tg is measured according to the standard ASTM D3418 (1999). The macrostructure (Mw, Mn and PDI) of the hydrocarbon resin is determined by size exclusion chromatography (SEC); solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 Waters columns in series (Styragel HR4E, HR1 and HR0.5); detection by differential refractometer (Waters 2410) and its associated operating software (Waters Empower).

The thermoplastic hydrocarbon resins may be aliphatic or aromatic or else of the aliphatic/aromatic type, that is to say based on aliphatic and/or aromatic monomers. They may be natural or synthetic and may or may not be based on petroleum (if such is the case, they are also known under the name of petroleum resins).

Suitable as aromatic monomers are, for example: styrene, α-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene or any vinylaromatic monomer resulting from a $C_9$ fraction (or more generally from a $C_8$ to $C_{10}$ fraction). Preferably, the vinylaromatic monomer is styrene or a vinylaromatic monomer resulting from a $C_9$ fraction (or more generally from a $C_8$ to $C_{10}$ fraction). Preferably, the vinylaromatic monomer is the minor monomer, expressed as molar fraction, in the copolymer under consideration.

According to a particularly preferred embodiment, the plasticizing hydrocarbon resin is selected from the group consisting of cyclopentadiene (abbreviated to CPD) or dicyclopentadiene (abbreviated to DCPD) homopolymer or copolymer resins, terpene homopolymer or copolymer resins, terpene/phenol homopolymer or copolymer resins, $C_5$ fraction homopolymer or copolymer resins, $C_9$ fraction homopolymer or copolymer resins and the mixtures of these resins, which can be used alone or in combination with a liquid plasticizer, for example an MES or TDAE oil. The term "terpene" groups together here, in a known manner, α-pinene, β-pinene and limonene monomers; use is preferentially made of a limonene monomer, a compound which exists, in a known manner, in the form of three possible isomers: L-limonene (laevorotatory enantiomer), D-limonene (dextrorotatory enantiomer) or else dipentene, the racemate of the dextrorotatory and laevorotatory enantiomers. Mention will in particular be made, among the above plasticizing hydrocarbon resins, of α-pinene, β-pinene, dipentene or polylimonene homopolymer or copolymer resins.

The preferential resins above are well known to those skilled in the art and are commercially available, for example sold as regards:
- aliphatic resin: by Cray Valley under the name Wingtack 10 (Mn=480 g/mol; Mw=595 g/mol; PDI=1.2; SP=10° C.; Tg=−28° C.);
- coumarone/indene resins: by Rütgers Chemicals under the name Novares C30 (Mn=295 g/mol; Mw=378 g/mol; PDI=1.28; SP=25° C.; Tg=−19° C.);
- aliphatic and aromatic $C_9$ fraction resins: by Rütgers Chemicals under the name Novares TT30 (Mn=329 g/mol; Mw=434 g/mol; PDI=1.32; SP=25° C.; Tg=−12° C.).

Preferentially, the content of low-Tg plasticizing hydrocarbon resin is greater than or equal to 5 phr, preferably within a range extending from 5 phr to 80 phr, preferentially from 7 to 75 phr, more preferentially still between 10 and 50 phr. This is because, below 5 phr of low-Tg resin, the composition might exhibit problems of tack and thus of industrial processability.

I-6-2 High-Tg Resin

Optionally, the combination of plasticizer may also contain a thermoplastic hydrocarbon resin, the Tg of which is greater than 20° C. This resin is a solid at ambient temperature (23° C.), in contrast to a liquid plasticizing compound, such as an oil, or a viscous plasticizing compound, such as a low-Tg resin.

Preferably, the thermoplastic plasticizing hydrocarbon resin has at least any one of the following characteristics:
- a Tg of greater than 30° C.;
- a number-average molecular weight (Mn) of between 400 and 2000 g/mol, more preferably between 500 and 1500 g/mol;
- a polydispersity index (PDI) of less than 3, more preferentially of less than 2 (as a reminder: PDI=Mw/Mn, with Mw the weight-average molecular weight).

More preferentially, this thermoplastic plasticizing hydrocarbon resin has all of the preferred characteristics above.

The macrostructure (Mw, Mn and PDI) of the hydrocarbon resin is determined by size exclusion chromatography (SEC); solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 Waters columns in series (Styragel HR4E, HR1 and HR0.5); detection by differential refractometer (Waters 2410) and its associated operating software (Waters Empower).

The thermoplastic hydrocarbon resins can be aliphatic or aromatic or also of the aliphatic/aromatic type, that is to say based on aliphatic and/or aromatic monomers. They can be natural or synthetic and based or not based on petroleum (if such is the case, they are also known under the name of petroleum resins).

Suitable as aromatic monomers are, for example: styrene, α-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene or any vinylaromatic monomer resulting from a $C_9$ fraction (or more generally from a $C_8$ to $C_{10}$ fraction). Preferably, the vinylaromatic monomer is styrene or a vinylaromatic monomer resulting from a $C_9$ fraction (or more generally from a $C_8$ to $C_{10}$ fraction). Preferably, the vinylaromatic monomer is the minor monomer, expressed as molar fraction, in the copolymer under consideration.

According to a particularly preferred embodiment, the plasticizing hydrocarbon resin is selected from the group consisting of cyclopentadiene (abbreviated to CPD) or dicyclopentadiene (abbreviated to DCPD) homopolymer or copolymer resins, terpene homopolymer or copolymer resins, terpene/phenol homopolymer or copolymer resins, $C_5$ fraction homopolymer or copolymer resins, $C_9$ fraction homopolymer or copolymer resins, α-methylstyrene homopolymer or copolymer resins and the mixtures of these resins, which can be used alone or in combination with a liquid plasticizer, for example an MES or TDAE oil. The term "terpene" groups together here, in a known way, α-pinene, β-pinene and limonene monomers; use is preferably made of a limonene monomer, a compound which exists, in a known way, in the form of three possible isomers: L-limonene (laevorotatory enantiomer), D-limonene (dextrorotatory enantiomer) or else dipentene, the racemate of the dextrorotatory and laevorotatory enantiomers. Mention will in particular be made, among the above plasticizing hydrocarbon resins, of α-pinene, β-pinene, dipentene or polylimonene homo- or copolymer resins.

The preferential resins above are well known to those skilled in the art and are commercially available, for example sold as regards:

polylimonene resins: by DRT under the name Dercolyte L120 (Mn=625 g/mol; Mw=1010 g/mol; PDI=1.6; Tg=72° C.) or by Arizona under the name Sylvagum TR7125C (Mn=630 g/mol; Mw=950 g/mol; PDI=1.5; Tg=70° C.);

$C_5$ fraction/vinylaromatic copolymer resins, in particular $C_5$ fraction/styrene or $C_5$ fraction/$C_9$ fraction copolymer resins: by Neville Chemical Company under the names Super Nevtac 78, Super Nevtac 85 and Super Nevtac 99, by Goodyear Chemicals under the name Wingtack Extra, by Kolon under the names Hikorez T1095 and Hikorez T1100 or by Exxon under the names Escorez 2101 and Escorez 1273;

limonene/styrene copolymer resins: by DRT under the name Dercolyte TS 105 from DRT or by Arizona Chemical Company under the names ZT115LT and ZT5100.

Mention may also be made, as examples of other preferred resins, of phenol-modified α-methylstyrene resins. In order to characterize these phenol-modified resins, it should be remembered that a number referred to as "hydroxyl number" (measured according to Standard ISO 4326 and expressed in mg KOH/g) is used in a known way. α-Methylstyrene resins, in particular phenol-modified ones, are well known to a person skilled in the art and are commercially available, for example sold by Arizona Chemical under the names Sylvares SA 100 (Mn=660 g/mol; PDI=1.5; Tg=53° C.); Sylvares SA 120 (Mn=1030 g/mol; PDI=1.9; Tg=64° C.); Sylvares 540 (Mn=620 g/mol; PDI=1.3; Tg=36° C.; hydroxyl number=56 mg KOH/g); and Silvares 600 (Mn=850 g/mol; PDI=1.4; Tg=50° C.; hydroxyl number=31 mg KOH/g).

According to a specific embodiment of the invention, when it is included in the composition, the content of plasticizing hydrocarbon resin with a Tg of greater than 20° C. is within a range extending from 5 to 50 phr, preferentially ranging from 5 to 40 phr, more preferentially still from 10 to 40 phr.

I-6-3 Plasticizing Oil

Optionally, the combination of plasticizer may also contain an extender oil (or plasticizing resin) which is liquid at 20° C., referred to as "low Tg", that is to say which, by definition, has a Tg of less than −20° C., preferably of less than −40° C.

Any extender oil, whether it is of aromatic or non-aromatic nature, known for its plasticizing properties with regard to diene elastomers can be used. At ambient temperature (20° C.), these oils, which are more or less viscous, are liquids (that is to say, as a reminder, substances which have the ability to eventually assume the shape of their container), in contrast in particular to plasticizing hydrocarbon resins, which are by nature solids at ambient temperature.

Extender oils selected from the group consisting of naphthenic oils (low or high viscosity, in particular hydrogenated or not), paraffinic oils, MES (Medium Extracted Solvates) oils, TDAE (Treated Distillate Aromatic Extracts) oils, mineral oils, vegetable oils, ether plasticizers, ester plasticizers, phosphate plasticizers, sulfonate plasticizers and the mixtures of these compounds are particularly suitable. For example, mention may be made of those which comprise between 12 and 30 carbon atoms, for example trioctyl phosphate. Mention may in particular be made, as examples of non-aqueous and water-insoluble ester plasticizers, of the compounds selected from the group consisting of trimellitates, pyromellitates, phthalates, 1,2-cyclohexanedicarboxylates, adipates, azelates, sebacates, glycerol triesters and the mixtures of these compounds. Mention may in particular be made, among the above triesters, of glycerol triesters, preferably predominantly composed (for more than 50%, more preferentially for more than 80%, by weight) of an unsaturated $C_{18}$ fatty acid, that is to say selected from the group consisting of oleic acid, linoleic acid, linolenic acid and the mixtures of these acids. More preferably, whether it is of synthetic origin or natural origin (case, for example, of sunflower or rapeseed vegetable oils), the fatty acid used is composed for more than 50% by weight, more preferably still for more than 80% by weight, of oleic acid. Such triesters (trioleates) having a high content of oleic acid are well known; they have been described, for example, in application WO 02/088238 as plasticizing agents in tyre treads.

According to a specific embodiment of the invention, when it is included in the composition, the content of extender oil is between 2 and 80 phr, more preferentially between 5 and 60 phr, more preferentially still between 10 and 50 phr. Below 2 phr of oil or above 80 phr of oil, the composition might have poorer performance in terms of wet grip, due to too high or too low a Tg of the mixture.

I-7 Ratio of the Contents of Filler and of Plasticizer

Preferentially, for the requirements of the invention, the contents of reinforcing filler and of plasticizer are such that the ratio of the total content of filler to the total content of plasticizer is within a range extending from 1.5 to 5. Below 1.5, the composition might exhibit a reduced hardness, resulting in a reduced vehicle behaviour performance, whereas, above 5, the composition might exhibit a high Mooney value, resulting in a reduced industrial processability.

Preferably, the ratio of the total content of filler to the total content of plasticizer is within a range extending from 1.6 to 4.5 and preferably from 1.7 to 2.5.

I-8 Other Possible Additives

The rubber compositions in accordance with the invention optionally also comprise all or a portion of the normal additives generally used in elastomer compositions intended in particular for the manufacture of treads, such as, for example, pigments, protective agents, such as antiozone waxes, chemical antiozonants or antioxidants, plasticizing agents other than those described above, anti-fatigue agents, reinforcing resins, or methylene acceptors (for example novolac phenolic resin) or donors (for example HMT or H3M).

Of course, the compositions in accordance with the invention can be used alone or in a blend (i.e., in a mixture) with any other rubber composition which can be used in the manufacture of tyres.

It is obvious that the invention relates to the rubber compositions described above both in the "uncured" or non-crosslinked state (i.e., before curing) and in the "cured" or crosslinked, or else vulcanized, state (i.e., after crosslinking or vulcanization).

II-Preparation of the Rubber Compositions

The compositions are manufactured in appropriate mixers, using two successive phases of preparation which are well known to a person skilled in the art: a first phase of thermomechanical working or kneading (sometimes referred to as "non-productive" phase) at high temperature, up to a maximum temperature of between 110° C. and 190° C., preferably between 130° C. and 180° C., followed by a second phase of mechanical working (sometimes referred to as "productive" phase) at lower temperature, typically below 110° C., for example between 60° C. and 100° C., during which finishing phase the crosslinking or vulcanization system is incorporated; such phases have been described, for example, in applications EP-A-0 501 227, EP-A-0 735 088, EP-A-0 810 258, WO00/05300 or WO00/05301.

The first (non-productive) phase is preferably carried out in several thermomechanical stages. During a first stage, the elastomers, the reinforcing fillers and the combination of plasticizers (and optionally the coupling agents and/or other ingredients, with the exception of the vulcanization system) are introduced into an appropriate mixer, such as an ordinary internal mixer, at a temperature between 20° C. and 100° C. and preferably between 25° C. and 100° C. After a few minutes, preferably from 0.5 to 2 min, and a rise in the temperature to 90° C. to 100° C., the other ingredients (that is to say, those which remain, if not all were put in at the start) are added all at once or in portions, with the exception of the vulcanization system, during a compounding ranging from 20 seconds to a few minutes. The total duration of the kneading, in this non-productive phase, is preferably between 2 and 10 minutes at a temperature of less than or equal to 180° C. and preferably of less than or equal to 170° C.

After cooling the mixture thus obtained, the vulcanization system is then incorporated at low temperature (typically less than 100° C.), generally in an external mixer, such as an open mill; the combined mixture is then mixed (productive phase) for a few minutes, for example between 5 and 15 min.

The final composition thus obtained is subsequently calendered, for example in the form of a sheet or of a slab, in particular for laboratory characterization, or else extruded, in order to form, for example, a rubber profiled element used in the manufacture of semi-finished articles, in order to obtain products such as a tread. These products can subsequently be used in the manufacture of tyres, according to the techniques known to a person skilled in the art.

The vulcanization (or curing) is carried out in a known way at a temperature generally between 130° C. and 200° C., under pressure, for a sufficient time which can vary, for example, between 5 and 90 min, as a function in particular of the curing temperature, of the vulcanization system adopted, of the kinetics of vulcanization of the composition under consideration or also of the size of the tyre.

The examples which follow illustrate the invention without, however, limiting it.

III—Exemplary Embodiments of the Invention

III-1 Preparation of the Examples

In the examples which follow, the rubber compositions were produced as described above.

III-2 Characterization of the Examples

In the examples, the rubber compositions are characterized, before and/or after curing, as indicated below.

Mooney Viscosity or Mooney Plasticity (before Curing):

Use is made of an oscillating consistometer as described in French standard NF T 43-005 (1991). The Mooney plasticity measurement is carried out according to the following principle: the composition in the uncured state (i.e., before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney unit" (MU, with 1 MU=0.83 newton.metre). The lower the Mooney value, the lower the viscosity before curing and the better the processability of the composition.

Dynamic Properties (after Curing):

The dynamic properties G* and tan(δ)max are measured on a viscosity analyser (Metravib V A4000) according to standard ASTM D 5992-96. The response of a sample of vulcanized composition (cylindrical test specimen with a thickness of 4 mm and a cross section of 400 mm$^2$), subjected to a simple alternating sinusoidal shear stress, at a frequency of 10 Hz, at 23° C., according to the standard ASTM D 1349-99, is recorded. A peak-to-peak strain amplitude sweep is carried out from 0.1% to 50% (outward cycle) and then from 50% to 1% (return cycle). The results utilized are the complex dynamic shear modulus (G*) and the loss factor (tan δ). The maximum value of tan δ observed (tan(δ)max) and the difference in complex modulus (ΔG*) between the values at 0.1% and at 50% strain (Payne effect) are indicated for the return cycle. The lower the value of tan(δ) max at 23° C., the lower the hysteresis of the composition and thus the lower the rolling resistance.

III-3 Examples

The compositions are manufactured with introduction of all of the constituents onto an internal mixer, with the exception of the vulcanization system. The vulcanization agents (sulfur and accelerator) are introduced onto an external mixer at low temperature (the constituent rolls of the mixer being at around 30° C.).

The object of the examples presented in Table 1 is to compare the various rubber properties of control compositions (T1 to T4) with compositions C1 and C2 in accordance with the invention. The measurement results for the properties measured, before and after curing, are presented in Table 2.

TABLE 1

|  | T1 | T2 | C1 | T4 | T3 | C2 |
|---|---|---|---|---|---|---|
| SBR (1) | 100 | 100 | 100 | 100 | 100 | 100 |
| Carbon black (2) | 3 | 3 | 3 | 3 | 3 | 3 |
| Silica (3) | 105 | 105 | 105 | 105 | 105 | 105 |
| High-Tg resin (4) | 34 | 0 | 0 | 20.75 | 20.75 | 20.75 |
| Low-Tg resin (5) | 0 | 41.5 | 41.5 | 20.75 | 20.75 | 20.75 |
| Oil (6) | 12 | 12 | 12 | 12 | 12 | 12 |
| Coupling agent 1 (7) | 0 | 8.4 | 0 | 8.4 | 0 | 0 |
| Coupling agent 2 (8) | 6.2 | 0 | 6.2 | 0 | 6.2 | 6.2 |
| DPG (9) | 0 | 0 | 0 | 1.9 | 1.9 | 0 |
| Octadecylamine | 2.2 | 2.2 | 2.2 | 0 | 0 | 2.2 |
| Antioxidant (10) | 3 | 3 | 3 | 3 | 3 | 3 |
| Antiozone wax | 2 | 2 | 2 | 2 | 2 | 2 |
| Stearic acid | 3 | 3 | 3 | 3 | 3 | 3 |
| Sulfur | 1 | 1 | 1 | 1 | 1 | 1 |
| Accelerator (11) | 2 | 2 | 2 | 2 | 2 | 2 |

(1) SBR solution with 26.5% of styrene units and 50% of 1,2- units of the butadiene part (Tg = −48° C.);
(2) N234 ASTM grade (Cabot)
(3) "Zeosil 1165 MP" silica from Rhodia, "HDS" type
(4) "Escorez 5600" high-Tg C9/DCPD hydrocarbon resin from Exxon
(5) "Novares C30" low-Tg hydrocarbon resin from Rütgers Chemical
(6) "Lubrirob Tod 1880" glycerol trioleate, sunflower oil comprising 85% by weight of oleic acid from Novance
(7) Coupling agent 1: TESPT ("Si69" from Evonik-Degussa)
(8) Coupling agent 2: bis(propyldimethylsilanol) polysulfide as described in document WO 02/31041 (or US 2004/051210)
(9) "Perkacit DPG" diphenylguanidine from Flexsys
(10) N-(1,3-Dimethylbutyl)-N'-phenyl-p-phenylenediamine (Santoflex 6-PPD) from Flexsys
(11) N-Cyclohexyl-2-benzothiazolesulfenamide (Santocure CBS from Flexsys)

TABLE 2

|  | T1 | T2 | C1 | T3 | T4 | C2 |
|---|---|---|---|---|---|---|
| Mooney (MU) | 50 | 57 | 50 | 61 | 55 | 51 |
| Tan(δ)max return at 23° C. | 0.37 | 0.30 | 0.30 | 0.36 | 0.35 | 0.33 |

In comparison with the control compositions, it is noted that the compositions in accordance with the invention have the best performance compromise between the Mooney value and the measurement of tan(δ)max at 23° C. This is because all the compositions in accordance with the invention make it possible to improve at least one property in comparison with the controls taken separately. These results show that the compositions of the invention enable good performance with regard to the essential aspects, which are the processability and the rolling resistance. None of the control compositions allow as good a compromise of these two performance properties simultaneously.

The invention claimed is:

1. A rubber composition based on at least:
a diene elastomer;
50 to 160 phr of inorganic reinforcing filler, phr being parts by weight per hundred parts by weight of elastomer;
a vulcanization system;
a plasticizing system comprising at least one hydrocarbon resin with a glass transition temperature Tg of between −40° C. and 0° C.;
a hydroxysilane polysulfide coupling agent having general formula (I):

$$(HO)_a R_{(3-a)} Si-R'-S_x-R'-SiR_{(3-b)}(OH)_b \quad (I),$$

in which the R radicals, which are identical or different, are hydrocarbon groups; the R' radicals, which are identical or different, are divalent connecting groups; a and b, which are identical or different, are equal to 1 or 2; and x is a number greater than or equal to 2; and
a primary amine having general formula (IV):

$$R-NH_2 \quad (IV)$$

in which R represents a linear or branched hydrocarbon group comprising from 8 to 24 carbon atoms,
wherein said rubber composition is devoid of or comprises less than 0.5 phr of guanidine derivative, and
wherein the at least one hydrocarbon resin is viscous at 20° C., has a number-average molecular weight of less than 400 g/mol, and has a softening point within a range extending from 10° C. to 30° C.

2. The rubber composition according to claim 1, wherein the R radicals of formula (I) comprise from 1 to 15 carbon atoms, and the R' radicals of formula (I) comprise from 1 to 18 carbon atoms.

3. The rubber composition according to claim 1, wherein the diene elastomer is selected from the group consisting of polybutadienes, synthetic polyisoprenes, natural rubber, butadiene copolymers, isoprene copolymers and mixtures thereof.

4. The rubber composition according to claim 1, wherein the diene elastomer is selected from the group consisting of polybutadienes, copolymers of butadiene and styrene, and mixtures thereof.

5. The rubber composition according to claim 1, wherein the inorganic reinforcing filler is selected from the group consisting of silicas, carbon blacks and mixtures thereof.

6. The rubber composition according to claim 1, wherein the content of inorganic reinforcing filler is within a range extending from 60 to 150 phr.

7. The rubber composition according to claim 1, wherein the inorganic reinforcing filler is silica.

8. The rubber composition according to claim 7, wherein the content of silica is within a range extending from 50 to 150 phr.

9. The rubber composition according to claim 8, wherein the content of silica is within a range extending from 60 to 150 phr.

10. The rubber composition according to claim 1, wherein silica is a predominant reinforcing filler.

11. The rubber composition according to claim 10, wherein the content of silica is within a range extending from 120 to 150 phr.

12. The rubber composition according to claim 11, wherein the content of silica is within a range extending from 130 to 150 phr.

13. The rubber composition according to claim 1, wherein the inorganic reinforcing filler comprises, in a minority amount, carbon black.

14. The rubber composition according to claim 13, wherein the content of carbon black is within a range between 0 and 50 phr.

15. The rubber composition according to claim 1, wherein a content of hydroxysilane polysulfide coupling agent is between 2 and 15 phr.

16. The rubber composition according to claim 15, wherein the content of hydroxysilane polysulfide coupling agent is between 3 and 13 phr.

17. The rubber composition according to claim 16, wherein the content of hydroxysilane polysulfide coupling agent is between 5 and 10 phr.

18. The rubber composition according to claim 1, wherein the hydroxysilane polysulfide coupling agent is a monohydroxysilane in which a and b are equal to 1.

19. The rubber composition according to claim 1, wherein the R radicals of formula (I) are selected from the group consisting of $C_1$-$C_6$ alkyls, $C_5$-$C_8$ cycloalkyls and a phenyl radical, and the R' radicals of formula (I) are selected from the group consisting of $C_1$-$C_{18}$ alkylenes and $C_6$-$C_{12}$ arylenes.

20. The rubber composition according to claim 1, wherein the R radicals of formula (I) are selected from the group consisting of $C_1$-$C_6$ alkyls, and the R' radicals of formula (I) are selected from $C_1$-$C_{10}$ alkylenes.

21. The rubber composition according to claim 1, wherein the hydroxysilane polysulfide coupling agent is a monohydroxysilane polysulfide of formula (II):

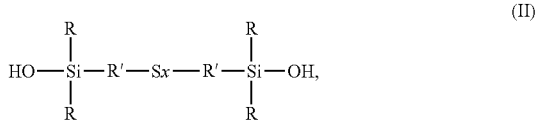

in which the R radicals are $C_1$-$C_3$ alkyls; the R' radicals are $C_1$-$C_4$ alkylenes; and x is greater than or equal to 2.

22. The rubber composition according to claim 21, wherein the R radicals of formula (II) are methyl groups, and the R' radicals of formula (II) are selected from the group consisting of methylene, ethylene or propylene.

23. The rubber composition according to claim 1, wherein the hydroxysilane polysulfide coupling agent is a bis(propyldimethylsilanol) polysulfide of formula (III):

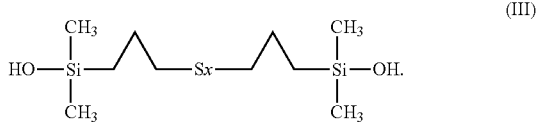

24. The rubber composition according to claim 1, wherein the rubber composition contains less than 0.45 phr of guanidine derivative.

25. The rubber composition according to claim 24, wherein the rubber composition contains less than 0.4 phr of guanidine derivative.

26. The rubber composition according to claim 1, wherein a content of primary amine is from 0.2 to 8 phr.

27. The rubber composition according to claim 26, wherein the content of primary amine is from more than 0.3 phr to 7 phr.

28. The rubber composition according to claim 27, wherein the content of primary amine is from 0.5 to 5 phr.

29. The rubber composition according to claim 28, wherein the content of primary amine is from more than 0.6 phr to 4 phr.

30. The rubber composition according to claim 1, wherein the R of formula (IV) is a hydrocarbon group comprising from 10 to 22 carbon atoms.

31. The rubber composition according to claim 30, wherein the R of formula (IV) is a hydrocarbon group comprising from 12 to 20 carbon atoms.

32. The rubber composition according to claim 31, wherein the R of formula (IV) is a hydrocarbon group comprising from 14 to 20 carbon atoms.

33. The rubber composition according to claim 1, wherein the R of formula (IV) is a linear hydrocarbon group.

34. The rubber composition according to claim 1, wherein the R of formula (IV) is an alkyl group or an alkenyl group.

35. The rubber composition according to claim 1, wherein the rubber composition is devoid of zinc or contains less than 0.5 phr of zinc.

36. The rubber composition according to claim 35, wherein the rubber composition contains less than 0.3 phr of zinc.

37. The rubber composition according to claim 36, wherein the rubber composition contains less than 0.2 phr of zinc.

38. The rubber composition according to claim 37, wherein the rubber composition contains less than 0.1 phr of zinc.

39. The rubber composition according to claim 1, wherein a total content of plasticizing system is greater than or equal to 5 phr.

40. The rubber composition according to claim 39, wherein the total content of plasticizing system is within a range extending from 10 to 120 phr.

41. The rubber composition according to claim 40, wherein the total content of plasticizing system is within a range extending from 10 to 100 phr.

42. The rubber composition according to claim 41, wherein the total content of plasticizing system is within a range extending from 15 to 90 phr.

43. The rubber composition according to claim 1, wherein a content of the hydrocarbon resin is within a range extending from 5 to 80 phr.

44. The rubber composition according to claim 43, wherein the content of the hydrocarbon resin is within a range extending from 7 to 75 phr.

45. The rubber composition according to claim 44, wherein the content of the hydrocarbon resin is within a range extending from 10 to 50 phr.

46. The rubber composition according to claim 1, wherein the hydrocarbon resin has a Tg of between −30° C. and 0° C.

47. The rubber composition according to claim 46, wherein the hydrocarbon resin has a Tg of between −20° C. and 0° C.

48. The rubber composition according to claim 1, wherein the hydrocarbon resin has a polydispersity index PDI of less than 3.

49. The rubber composition according to claim 48, wherein the hydrocarbon resin has a polydispersity index PDI of less than 2.

50. The rubber composition according to claim 1, wherein the plasticizing system further comprises a hydrocarbon resin with a Tg of greater than 20° C.

51. The rubber composition according to claim 50, wherein a content of the hydrocarbon resin with a Tg of greater than 20° C. is within a range extending from 5 to 50 phr.

52. The rubber composition according to claim 51, wherein the content of the hydrocarbon resin with a Tg of greater than 20° C. is within a range extending from 5 to 40 phr.

53. The rubber composition according to claim 52, wherein the content of the hydrocarbon resin with a Tg of greater than 20° C. is within a range extending from 10 to 40 phr.

54. The rubber composition according to claim 50, wherein the hydrocarbon resin with a Tg of greater than 20° C. has a Tg of greater than 30° C.

55. The rubber composition according to claim 50, wherein the hydrocarbon resin with a Tg of greater than 20° C. has a number-average molecular weight of between 400 and 2000 g/mol.

56. The rubber composition according to claim 55, wherein the hydrocarbon resin with a Tg of greater than 20° C. has a number-average molecular weight of between 500 and 1500 g/mol.

57. The rubber composition according to claim 50, wherein the hydrocarbon resin with a Tg of greater than 20° C. has a polydispersity index PDI of less than 3.

58. The rubber composition according to claim 57, wherein the hydrocarbon resin with a Tg of greater than 20° C. has a polydispersity index PDI of less than 2.

59. The rubber composition according to claim 1, wherein the plasticizing system further comprises a plasticizing oil.

60. The rubber composition according to claim 59, wherein the plasticizing oil is selected from the group consisting of naphthenic oils, paraffinic oils, medium extracted solvates oils, treated distillate aromatic extracts oils, mineral oils, vegetable oils, ether plasticizers, ester plasticizers, phosphate plasticizers, sulfonate plasticizers and mixtures thereof.

61. The rubber composition according to claim 59, wherein a content of plasticizing oil is within a range extending from 2 to 80 phr.

62. The rubber composition according to claim 61, wherein the content of plasticizing oil is within a range extending from 5 to 60 phr.

63. The rubber composition according to claim 1, wherein a ratio of a total content of inorganic reinforcing filler to a total content of plasticizing system is within a range extending from 1.5 to 5.

64. The rubber composition according to claim 63, wherein the ratio of the total content of inorganic reinforcing filler to the total content of plasticizing system is within a range extending from 1.6 to 4.5.

65. A tire comprising a rubber composition according to claim 1.

66. The tire according to claim 65, wherein the rubber composition constitutes all or part of the tread.

* * * * *